United States Patent [19]

Steff

[11] Patent Number: 5,332,171
[45] Date of Patent: Jul. 26, 1994

[54] WINDING DEVICE FOR WINDING UP AND UNWINDING A TUBE, CABLE OR HOSE

[76] Inventor: Josef Steff, Hagenbuchring 19, 8831 Meinheim, Fed. Rep. of Germany

[21] Appl. No.: 852,623

[22] Filed: Mar. 13, 1992

[30] Foreign Application Priority Data

Mar. 15, 1991 [DE] Fed. Rep. of Germany ....... 4108534

[51] Int. Cl.⁵ ............................................ B65H 75/48
[52] U.S. Cl. .................................. 242/378; 242/388.6
[58] Field of Search ........... 242/107.1, 107.11, 107.12, 242/107.5, 107.6, 107.7, 54 R, 101.1, 86.6; 191/12.2 R

[56] References Cited

U.S. PATENT DOCUMENTS

| | | | |
|---|---|---|---|
| 1,868,409 | 7/1932 | Crisper | 242/107.1 |
| 2,164,654 | 7/1939 | Kersting | 242/107 |
| 3,409,246 | 11/1968 | DePas | 242/107 |
| 4,171,109 | 10/1979 | Roe | 242/107 |
| 4,728,141 | 3/1988 | Motozawa et al. | 242/107 |
| 5,094,396 | 3/1992 | Burke | 242/107.1 |

FOREIGN PATENT DOCUMENTS

| | | |
|---|---|---|
| 416196 | 8/1989 | European Pat. Off. |
| 3406221 | 2/1984 | Fed. Rep. of Germany . |
| 1458356 | 10/1966 | France . |
| 0697640 | 9/1953 | United Kingdom .............. 242/107.1 |

Primary Examiner—William A. Cuchlinski, Jr.
Assistant Examiner—William C. Dowling
Attorney, Agent, or Firm—Dena Meyer Weker

[57] ABSTRACT

A winding device for winding up and unwinding a cable, tube or hose which comprises a cable, tube or hose section which can be wound on and unwound from the outer circumference, a cable, tube or hose section which is guided out of a hub and which does not turn with the rotatable drum and a spiral compensation length in the interstice between the rotating drum and the hub.

The compensation length is supported on a supporting disc comprising an outer supporting ring which turns with the rotatable drum and an inner supporting disc between the outer supporting ring and the hub which does not turn with the rotatable drum. Furthermore, the hub is axially subdivided into two hub parts which can be displaced relative to each other and which can be firmly joined by means of a detachable locking device. When the locking device is open, a hub part linked with a turning spring can be turned relative to the hub part linked with the compensation length of the cable, tube or hose in order to pre-span the spring as desired. The two hub parts are then firmly interlocked by means of the locking device when the desired pre-tension has been set by the corresponding turning position.

11 Claims, 3 Drawing Sheets

WINDING DEVICE FOR WINDING UP AND UNWINDING A TUBE, CABLE OR HOSE

FIELD OF THE INVENTION

The invention relates to a winding device for winding and unwinding a cable. The device has a rotatable drum in the form of a hollow cylinder, around the outer circumference of which a pull-out length of the cable can be wound or unwound therefrom, by turning the drum, with a hub which is arranged within the drum. The hub does not turn with the rotatable drum, at least not during the winding and unwinding process.

The winding device further comprises a disc device which supports the cable and which extends radially between the hub and the rotatable drum, a turning drive for turning the rotatable drum, at least in the winding up direction, so that a cable end which is guided out of the winding device at the hub side and a part of the cable which is spirally arranged in the radial interstice between the rotatable drum and the hub and is supported by the supporting disc device. This device allows the pull-out length of the cable to be wound up and unwound even if the rotatable drum turns relative to the cable end at the hub side. The supporting disc device is provided with at least one intersupporting disc arranged concentrically around the hub and an outer supporting ring which is arranged concentrically around the inner supporting disc and turns with the rotatable drum.

BACKGROUND OF THE INVENTION

Winding devices are very common and useful for winding up and unwinding electrical cables, such as power supply cables. Conventional uses include vacuum cleaners with connection cables that can be pulled out of the housing and which are automatically retracted into the housing of the appliance after use and when a winding stop is released. Another example is a unit for programming robots wherein an electrical cable, whose unwindable end is connected to an operating unit, can be pulled out from a computer-connected operating console far enough to allow the operator to leave the moving range of the robot with the operating unit connected to the cable. The cable leaves the operator enough freedom to move around the robot outside the moving range of the robot.

Winding devices of the type described above either work horizontally with a horizontally arranged cable coil, or vertically with a vertically arranged cable coil. In the former case, the cable coil is supported on a supporting disc device. In the latter case, the cable coil can be held between two vertical supporting discs.

In conventional winding devices of the type described above, the supporting disc revolves with the outer drum so that only the hub remains stationary during winding and unwinding. During unwinding, an increasing proportion of the cable coil is wound around the outer circumference of the stationary hub. During the winding process, an increasing proportion of the cable coil is wound around the inner circumference of the rotatable drum. Whenever the cable is being wound or unwound, the cable coil will be wound either around the hub or the circumference of the rotatable drum. A part of the cable will always be in the transitional area between the cable section wound up on the hub and the cable section wound up on the rotatable drum. Since the entire supporting disc turns with the rotatable drum, friction occurs between the supporting disc and the cable coil, dragging along the cable. In other words, due to friction, the rotating supporting disc tries to entrain the cable it supports. This has a positive effect when the cable is wound up on the drum, as a part of the cable wound on the drum is supported to move with the drum, but has a negative effect on the part of the cable wound on the stationary hub and on the part of the cable in the transitional area between the part of the cable wound on the hub and the part of the cable wound on the rotatable drum. The frictional dragging effect leads to buckling of the cable and the formation of undesirable loops, in particular in the transitional area. Such buckles and loops exert an undesirable mechanical stress on the cable. The loops may even fill the radial area between the part of the cable on the hub and that on the rotatable drum, to such an extent that the winding or unwinding process will be impaired.

There is a need for a device that allows the winding and unwinding of a cable but minimizes the frictional dragging effects, buckling and mechanical stress.

SUMMARY OF THE INVENTION

A winding device is provided having a supporting disc device with at least one inner supporting disc which is independent of the rotation of the rotatable drum and arranged concentrically around the hub and further having an outer supporting ring which is arranged concentrically around the inner supporting disc and turns with the rotatable drum.

The radial width of the outer supporting ring preferably equals that of the cable when its entire length is wound up spirally around the circumference of the rotatable drum, the remaining radial part between the hub and the inner circumference of the rotatable drum being taken up by the inner supporting disc.

The supporting disc device is designed so that it is the only part of the cable which is spirally wound up on the rotatable drum that is entrained with the latter. The part of the cable spirally wound up on the hub and the part of the cable in the transitional area between the hub and the rotatable drum remains free from entraining forces because the inner supporting disc does not turn with the rotatable drum. This prevents the cable from forming buckles and loops as it does with conventional winding devices.

In case the winding device is used in an arrangement wherein the cable coil extends vertically, it is advantageous to provide one supporting disc on each side of the cable coil, with an outer supporting ring turning with the rotatable drum and an inner supporting disc not turning with the rotatable drum. On both sides of the cable, this construction ensures that entraining forces cannot act on any part of the cable located outside of the rotatable drum.

The inner supporting disc may either be connected firmly to the hub so that it is stationary with the latter, or it may be freely rotatable relative to the hub and to the rotatable drum. In this case any frictional entraining forces exerted by the cable on the inner supporting disc may be utilized to make the inner supporting disc turn with the part of the cable exerting the entraining forces so that the relative displacements between the inner supporting disc and the part of the cable exerting the entraining forces will be reduced.

These entraining forces can be very efficiently reduced if the inner supporting disc is composed of a number of concentric inner supporting rings each of which is freely rotatable relative to the hub, the rotatable drum and the other inner supporting rings. The differing entraining effects depend on the location within the transitional area between the part of the cable wound on the hub and that on the drum and can be compensated for by differing rotatory movements of the particular inner supporting rings concerned.

A turning drive is provided at least for winding up the cable. The unwinding rotation of the rotatable drum may also be affected by the cable being unwound from the outer circumference of the rotatable drum. The turning drive may be affected by an electric motor. In this case both the winding and the unwinding movements of the rotatable drum may be affected by an electric motor. Alternatively, a spring, in particular a spiral spring, may be used. One end of the spring is connected to the hub, the other end to the rotatable drum. Tension is imparted to the spring by the turning movement during unwinding, which gives the spring a drive potential in the winding up direction.

The winding device of this invention is primarily used to provide an uninterrupted connection of the cables of a stationary device and a mobile device. In this case, the hub and the cable end guided out of the winding device at the side of the hub are held stationary when the rotatable drum turns. Alternatively, the hub may be turned at a different number of rotations per minute than the rotatable drum while the rotatable drum turns in the winding up or unwinding direction. In this operating mode, the winding device of the invention serves as a torque converter between the rotatory movement of the cable coil around the outer circumference of the rotatable drum and a rotatory movement of the cable end at the side of the hub.

In a particularly preferred embodiment, the hub is subdivided into two hub parts in the axial direction. One part of the hub is assigned to the spring, whereas the other part of the hub is assigned to the spirally wound cable. By turning the part of the hub connected with the spring relative to the part of the hub connected with the cable coil, the desired pre-tension can be imparted to the spring. In this case, the cable coil is preferably not turned. As soon as the desired pre-tension of the spring has been reached, the two parts of the hub which can be turned relative to each other are firmly interlocked. The locking device should make it possible to lock both parts of the hub with each other in different relative turning positions. The locking device is preferably detachable so that a spring pre-tension set can be changed at any time, such as to re-span the spring of a winding device after a certain time of use.

The spring spanning device with a partitioned hub is preferable for a winding device with a sub-divided supporting disc device and for conventional winding devices with a single supporting disc turning in line with the rotatable drum. The spring spanning device has an inventive character both in connection with a conventional winding device and a subdivided supporting disc device for a winding device as described in the invention.

It used to be relatively difficult to set the desired pre-tension of the spring for winding up and unwinding cables with conventional winding devices. This task is considerably facilitated by a hub sub-divided as described hereinbelow, even more so if the part of the hub assigned to the spring is provided with a nose which extends through and protrudes from the housing, which is usually provided for such winding devices, and out of said housing and which is preferably provided with a device to which a tool can be applied, such as two diametrically opposed flattened areas to which a wrench can be applied. In this case the locking device can be preferably locked or opened when the housing of the winding device is closed. The desired pre-tension of the spring can then be set as follows. The cable end drawn off the circumference of the rotatable drum is clamped into a device, such as a tension-meter, the hub interlocking device is released, the part of the hub to which the spring is assigned is turned until, in the winding up direction of the rotatable drum, the desired tensional force is exerted on the cable end pulled off the rotatable drum. Subsequently, the two hub parts are interlocked again.

DETAILED DESCRIPTION OF THE PRESENT INVENTION

The invention is best understood with reference to the accompanying drawings. The following description relates to a winding device with a horizontal cable coil. "Cables" as used herein includes single and multi-core electrical or other signal transmission cables as well as tubes and hoses for liquid or gas transfer. With respect to cables, both round and flat cables are envisioned to be within the scope of this invention.

Figure 1:
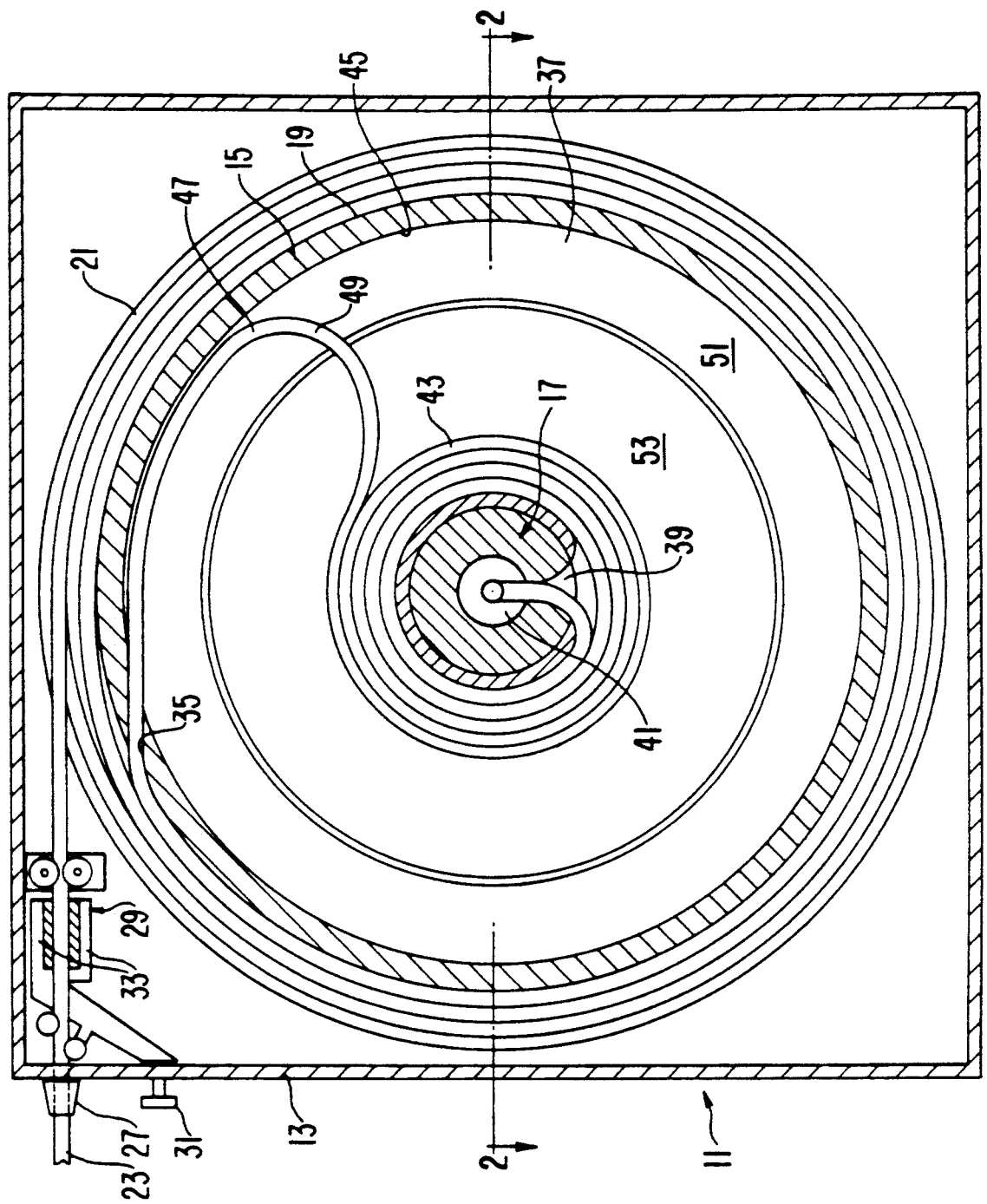
FIG. 1 is a horizontal section through a winding device with a housing as described in the present invention.
Figure 2:
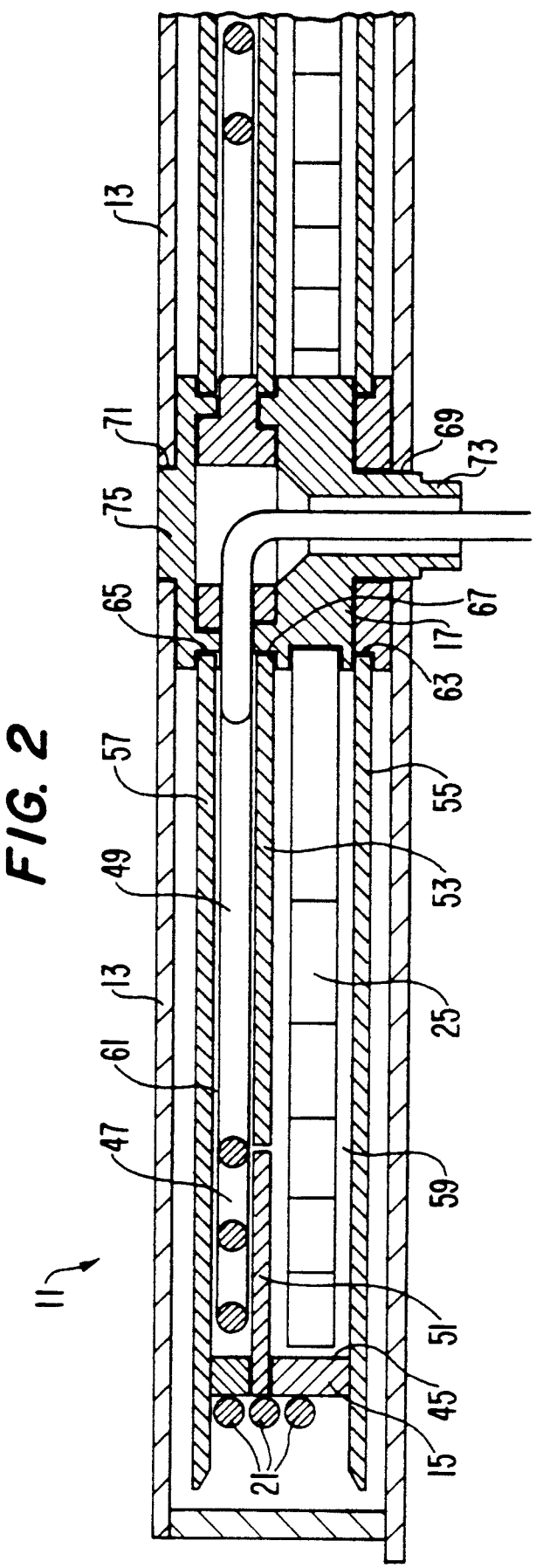
FIG. 2 is a vertical section through a line 2—2 in FIG. 1.

FIG. 1 shows a winding device 11 with a housing 13 which accommodates a rotatable drum 15 rotatably and concentrically arranged around a hub 17. A pull-out length 21 of an electrical cable 23 is wound onto the outer circumference 19 of the rotatable drum. The pull-out length 21 of the cable 23 can be unwound from the rotatable drum 15 which the rotatable drum 15 turns counterclockwise. At the same time a spiral spring 25 shown in FIG. 2 is spanned.

The spanned spiral spring 25 is used as a turning drive for winding up the pulled out section of the cable 23 onto the outer circumference 19 of the rotatable drum 15. This spring is pre-spanned so that it makes the rotatable drum 15 turn at least until the pull-out length 21 of the cable 23 is completely wound up in the clockwise direction. A decelerating device 29 is arranged in the cable unwinding direction in front of a cable insertion opening 27 of the housing 13. The decelerating device allows the cable 23 to be unwound from the rotatable drum 15 but prevents the cable 23 from being wound onto the rotatable drum 15 by the pre-spanned spring 25. When the unwound cable 23 is to be wound onto the rotatable drum 15, the decelerating device 29 is partly or fully deactivated by pressing a release button 31. For this purpose, brake pads are arranged at both sides of the cable 23. The brake pads may be partly or completely opened or closed like a pair of pincers.

Through an insertion opening 35 in the drum, the cable 23 is guided into the interior 37 of the rotatable drum 15. In the turning position of the rotatable drum 15 shown in FIG. 1, a considerable part of the pull-out length 21 is wound around the rotatable drum 15 and the bulk of the cable 23 located in the interior 37 is spirally wound around the hub 17. The hub 17 has a radial hub insertion opening 39 through which the cable 23 is guided into an inner chamber 41 of the hub 17 from where it is axially guided out of the hub 17 in the axis of rotation of the winding device. The cable 23 is attached in such a way that its positions in the openings 35 and 39 are undisplaceable.

When the cable 23 is unwound from the circumference 19 of the rotatable drum 15, the part 43 of the cable wound around the hub is gradually unwound and an increasing part 47 of the cable 23 is spirally wound around the rotatable drum. A transitional part 49 of the cable 23 is located between the part 43 wound up on the hub and the part 47 wound up on the rotatable drum.

The part of the cable 23 located in the interior 37 of the rotatable drum 15 is supported on a supporting disc device which is formed by an outer supporting ring 51 arranged radially adjacent to the rotatable drum 15 and an inner supporting disc 53 taking up the radial space between the outer supporting ring 51 and the hub 17. The outer supporting ring 51 turns with the rotatable drum 15. In the embodiment shown here, the inner supporting disc 53 is freely rotatable relative to the hub 17, to the rotatable drum 15 and to the outer supporting ring 51. The radial width of the outer supporting ring 51 corresponds to that of the part 47 of the cable wound up on the rotatable drum if virtually the entire length of the part of the cable 23 located in the interior 37 is wound up on the inner circumference 45 of the rotatable drum 15. In other words, the radial width of the outer supporting ring 51 is such that in any case the entire part 47 of the cable wound up on the rotatable drum 15 is located on the outer supporting ring 51 turning with the rotatable drum 15. When the rotatable drum 15 turns, the part 43 of the cable 23 on the hub and the bulk of the transitional part 49 of the cable 23 are therefore located on the inner supporting disc 53 where they are not turned with the rotatable drum. For this reason these sections of the cable are free from displacements and loops formed due to frictional entrainment effects of a rotating supporting disc. The part 47 of the cable wound up on the rotatable drum always turns with the rotatable drum 15 as required because it always lies on the outer supporting ring 51.

FIG. 2 is a vertical sectional view showing a detail of a winding device 11 according to FIG. 1. The drawing shows only part of the right radius of the winding device 11 of FIG. 1. As shown in FIG. 2, the rotatable drum 15 is constructed as a hollow cylinder the lower axial end of which is provided with a lower drum cover 55 and the upper axial end of which is provided with an upper drum cover 57, the entire interior of the cylinder is subdivided into two adjacent axial chambers by means of a supporting disc device comprising an inner supporting disc 53 and an outer supporting ring 51. A lower chamber 59 accommodates the spiral spring 25. An upper chamber 61 accommodates the part of the cable 23 located between the inner circumference 45 of the rotatable drum 15 and the outer circumference of the hub 17 which is identified as the compensation length.

In the turning position of the rotatable drum 15 in FIG. 2 the compensation length is basically located in a cable part spirally wound up on the inner circumference 45 of the rotatable drum, designated as 47. A vertical section in FIG. 2 shows a different turning position and another spiral distribution of the compensation length than the horizontal section shown in FIG. 1.

One end of the spiral spring is attached to the hub 17 and the other end to the circumference of the rotatable drum 15. When the drum 15 is turned relative to the hub 17, the tension potential of the spiral spring 25 will either be increased or decreased, by adapting the driving force to the sense of rotation.

The lower drum cover 55, the upper drum cover 57 and the inner supporting disc 53 are non-rotatably mounted in the grooves 63, 65 or 67 in the outer circumference of the hub 17. The drum covers 55 and 57 are turned with the rotatable drum 15 and the outer circumferential grooves 63 and 65 serve as sliding bearings for the drum covers 55 and 57. The inner supporting disc 53 can also be turned relative to the hub 17 within its outer circumferential groove 67, but will not be driven when the rotatable drum 15 turns. It is therefore basically stationary relative to the hub 17. It may only follow a winding movement of the transitional part 49 of the cable 23 to compensate for frictional entrainment forces.

The housing 13 is equipped with a lower hub uptake opening 69 and an upper hub uptake opening 71 through which an axial lower end 73 or an axial upper end 75 of the hub 17 can be guided, respectively.

Figure 3:
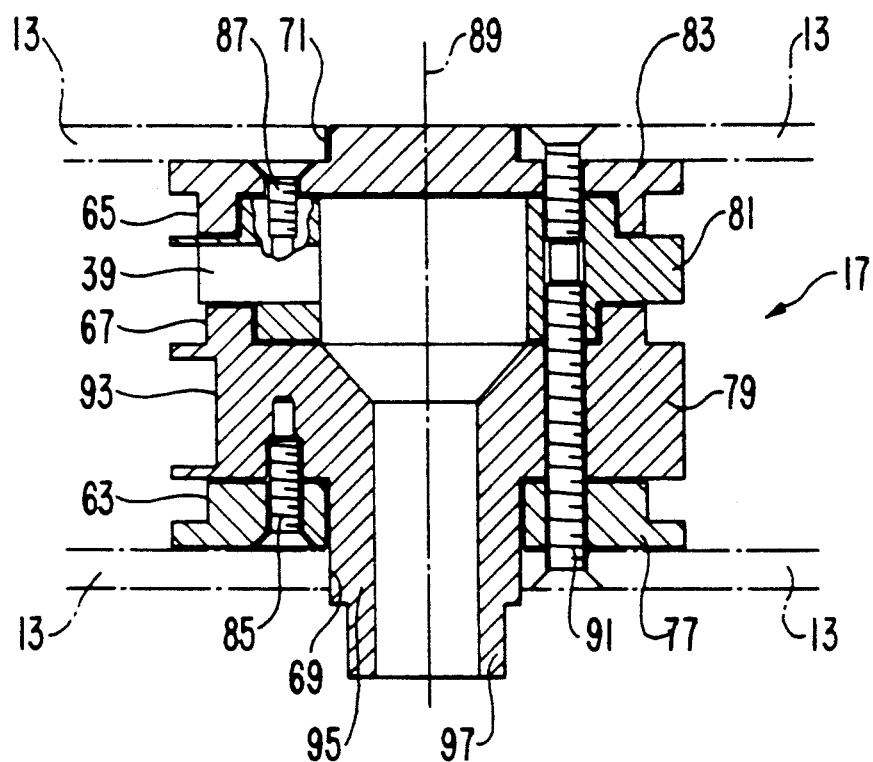
FIG. 3 is a detail from a vertical section through a hub of the winding device shown in FIGS. 1 and 2.

Further details of the hub 17 are shown in the detail section of FIG. 3. Here, the hub 17 comprises four hub parts, seen in the axial direction from top to bottom: a lower hub ring 77, a lower hub disc 79, an upper hub disc 81 and an upper hub ring 83. Both hub rings 77 and 83 are attached by screws 85 and 87 to the hub discs 79 and 81. The hub rings are removed for assembly of the drum covers 55 and 57 and screwed to the hub discs 79 and 81 after the covers have been placed on the hub 17. A locking bolt 91 is guided parallel to the axis of rotation through the entire hub 17 and keeps the two hub discs 79 and 81 firmly interlocked. When the locking bolt 91 is removed from the hub 17, the two hub discs 79 and 81 can be turned relative to each other, such that the hub disc 79, which is provided with a spring accommodation groove 93 for the spiral spring 25, can be turned into any desired position towards the hub disc 81 equipped with the opening 39 for guiding the cable 23 through the hub 17. When the locking bolt 91 has been removed, the tension of the spiral spring 25 may be controlled in accordance with the relative sense of rotation of the hub disc 79 relative to the hub disc 81. Once the desired spring tension is set, the locking bolt 91 is plugged through the hub discs 81 and 79 and the hub rings 77 and 83 in the desired position and attached thereto. At least one of the two hub discs 79 and 81 is provided with several bolt insertion openings to allow for various relative turning positions between hub discs 79 and 81. The other hub discs needs only one bolt insertion opening. In practice, several locking bolts 91 will be distributed around the circumference of the hub 17, with an equal number of bolt insertion openings in one of the two hub discs 79 and 81 and a number of bolt insertion openings corresponding to the number of adjustment options in the other hub disc 79 and 81.

An axially arranged axle nose 95 of the hub disc 79 is guided out of the housing 13 through the lower hub uptake opening 69 so that the two hub discs 79 and 81 can be turned relative to each other when the locking bolt 91 is removed without having to open the housing 13 of the winding device 11. The free end of the axle nose 95 is provided with a device which can be tackled by a turning tool. Preferably this device consists of two diametrically opposed flattened areas 97 which allow for handling by a wrench. The axis symmetry is designated as 89.

The locking bolt 91 is also guided through the walls of the housing 13 so that the positions of hub discs 81 and 79 can be changed without opening the housing 13 and the locking bolt 91 can be mounted to and removed from the closed housing 13.

I claim:

1. A winding device for winding and unwinding a cable comprising:
    (a) a rotatable drum in the form of a hollow cylinder around an outer circumference of which a pull-out length of the cable can be wound or unwound therefrom, by turning the rotatable drum;
    (b) a hub arranged within the rotatable drum which does not turn with the rotatable drum during the winding and unwinding process;
    (c) a supporting disc device which supports the cable and extends radially between the hub and the rotatable drum;
    (d) a turning drive for turning the rotatable drum at least in the winding direction, wherein a cable end at the hub side is guided out of the winding device and a part of the cable is spirally arranged in a radial interstice between the rotatable drum and the hub and is supported by the supporting disc device, said part of the cable allowing a pull-out length of the cable to be wound and unwound despite a relative turning of the rotatable drum relative to the cable end at the hub side;
    (e) wherein the supporting disc device is provided with at least one inner supporting disc arranged concentrically around the hub, independent of rotation of the rotatable drum and an outer supporting ring which is arranged concentrically around the inner supporting disc and turns with rotatable drum; and
    (f) wherein the inner supporting disc is freely rotatable relative to the hub and relative to the rotatable drum.

2. A winding device of claim 1, wherein the radial width of the outer supporting ring equals approximately the radial width of the cable when the maximum possible cable length is spirally wound around the circumference of the rotatable drum and the remaining radial width is covered by the inner supporting disc.

3. A winding device of claim 1, wherein the inner supporting disc is composed of several concentric inner supporting rings which are freely rotatable relative to the hub, to the rotatable drum and to each other.

4. A winding device of claim 1, wherein the drive is affected by an electric motor.

5. A winding device of claim 1, wherein the drive is effected by a spiral spring, which is spanned when the length of the cable is unwound from the outer circumference of the rotatable drum.

6. A winding device of claim 1, wherein a stop is provided which can be released to counteract the drive.

7. A winding device of claim 1, wherein the winding device is provided with a horizontal cable coil, and the supporting disc device is formed by a horizontal supporting disc with an inner supporting disc and an outer supporting ring on which the wound up cable rests.

8. A winding device of claim 1, wherein the winding device is provided with a vertical cable coil, and the cable is spirally arranged between two vertical supporting discs with one inner supporting disc and one outer supporting ring each.

9. A winding device according to claim 1, having a drive in the form of a spring which is spanned by the unwinding process and which effects a drive in the winding up direction, wherein a ring chamber between the hub and the circumference of the rotatable drum is subdivided into two axially separate accommodation chambers, one for the spring and one for the cable coil, by the supporting disc device and wherein the spring is connected to the hub at one end and to the circumference of the rotatable drum at the other end, and further wherein the hub is axially subdivided in accordance with the two accommodation chambers, in such a way that the part of the hub which is connected with the spring accommodation chamber and to which one end of the spring is attached, can be turned relative to the part of the hub connected to the accommodation chamber for the cable coil, and that a detachable locking device is provided to achieve a firm interlocking of both hub parts with each other in one of several different, selectable turning positions relative to each other.

10. A winding device of claim 9, wherein one of the two hub parts is provided with at least one bolt insertion opening parallel to the hub axis and the other hub part is provided with numerous bolt insertion openings evenly distributed around the hub axis, wherein a relative turn of both hub parts to each other causes at least one bolt insertion opening in one hub part to be aligned flush with one of the bolt insertion openings in the other hub part so that a locking bolt can be pushed through the aligned bolt insertion openings of both hub parts to achieve a firm interlocking effect.

11. A winding device of claim 9, wherein the winding device is accommodated in a housing and that the part of the hub connected with the spring is equipped with an area which protrudes from the housing and to which a tool can be applied and that the locking device can be actuated from outside of the housing.

* * * * *